J. KARITZKY.
CONDUIT OR CABLE CLAMP AND BRIDLE RING.
APPLICATION FILED OCT. 14, 1920.

1,419,932.

Patented June 20, 1922.

INVENTOR
John Karitzky
BY
*[signature]*
ATTORNEY

UNITED STATES PATENT OFFICE.

JOHN KARITZKY, OF GARWOOD, NEW JERSEY, ASSIGNOR, BY MESNE ASSIGNMENTS, TO HENRY B. NEWHALL, OF PLAINFIELD, NEW JERSEY.

CONDUIT OR CABLE CLAMP AND BRIDLE RING.

1,419,932.          Specification of Letters Patent.     Patented June 20, 1922.

Application filed October 14, 1920. Serial No. 416,982.

*To all whom it may concern:*

Be it known, that I, JOHN KARITZKY, a citizen of the United States, residing at Garwood, in the county of Union and State of New Jersey, have made certain new and useful Improvements in Conduit or Cable Clamps and Bridle Rings, of which the following is a specification taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense, and to which a bridle ring may be secured either at the original installation of the cable and conduit clamp, or at any future time when it may be desirable to support one or more runs of bridle wires.

My invention further relates to a conduit or cable clamp in which a portion of the base is cut or slitted so as to form a clamping finger or lug, which is bent back on the base and is adapted to clamp a bridle ring on the upper exposed surface of the base.

My invention further relates to such a conduit or cable clamp in which the arm of a bridle ring will rest upon the flat surface of the base while the shank is clamped above the surface of the base by the clamping finger or lug.

My invention further relates to such a conduit or cable clamp provided with a cut or slotted flange forming an intermediate finger or lug which is adapted to clamp a bridle ring upon the outer surface of the base, while the flange holds the bridle ring away from the wall or other suitable support.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

Figure 1:
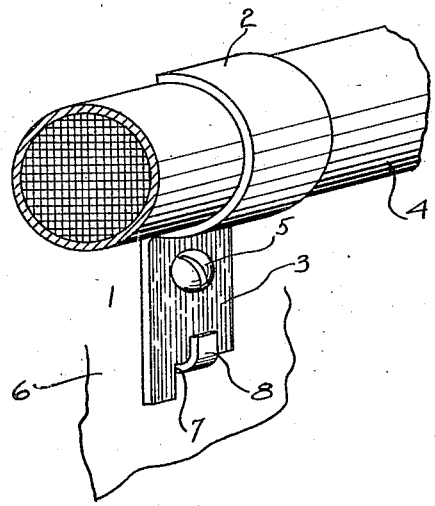
Fig. 1 is a perspective view of my conduit or cable clamp and of a cable which it supports.
Figure 2:
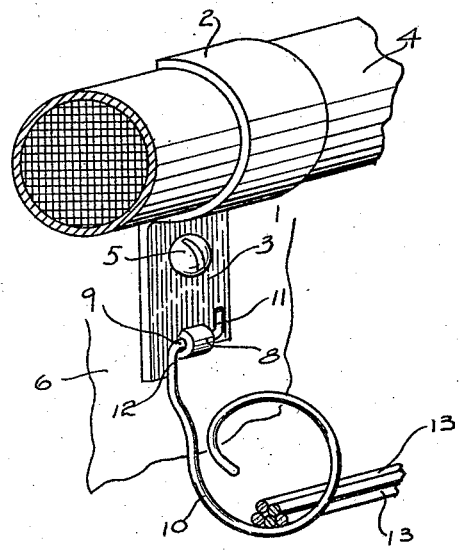
Fig. 2 is a perspective view of the conduit or cable clamp shown in Fig. 1 with the addition of one form of bridle ring which I may employ.

In the form of my invention shown in Figs. 1 and 2, I use the conduit or cable clamp 1 having a hook 2 and a base 3. This clamp supports the conduit or cable 4 by means of the securing screw 5 upon the wall or other support 6. I provide the lower portion of the base 3 with a kerf or slit 7, forming a clamping finger or lug 8, which is bent back on the exposed surface of the base 3.

Ordinarily the conduit or cable clamp 1 will be first used as shown in Fig. 1. Later, when the traffic becomes excessive upon the cable 4, and the telephone or telegraph engineers desire to increase the capacity of the installation, it is merely necessary to bring the shank 9 of the bridle ring 10 over the finger or lug 8 and then bend the finger or lug down, as shown in Fig. 2. This shank is preferably provided with a toe 11, which engages on the exposed surface of the base 3, as does the arm 12 of the bridle ring 10.

In this form of my invention no part of the bridle ring comes in contact with the wall or other suitable support 6. Runs of bridle wires 13, 13 can then be threaded through the bridle ring as shown in Fig. 2.

Figure 3:
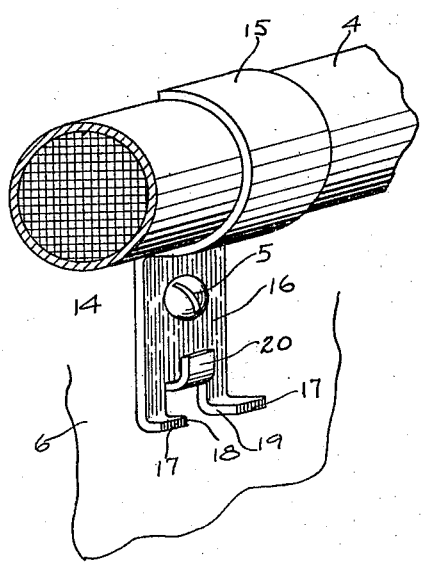
Fig. 3 is a perspective view of a different form of conduit or cable clamp.
Figure 4:
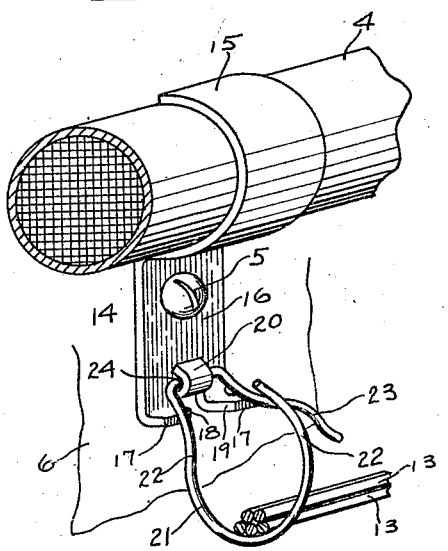
Fig. 4 is a perspective view of the conduit or cable clamp shown in Fig. 3, with the addition of a different form of bridle ring, which I preferably employ in this modification of my invention.

I have shown a modification of my invention in Figs. 3 and 4, in which the conduit or cable clamp 14 is provided with a hook portion 15, and a base 16. This base 16 has its lower end bent at right angles to form a flange 17, which is provided with two slits or kerfs 18 and 19, forming an intermediate clamping finger or lug 20.

In this form of my invention I use a substantially closed bridle ring 21, having two arms 22 and 23, which overlap each other. A portion 24 of this bridle ring is brought over the clamping finger or lug 20 and there secured as shown in Fig. 4. The two arms 22 and 23 rest upon the slotted flange 17 as shown in Fig. 4, the flange serving to throw the bridle ring away from the wall or other suitable support 6. When the bridle wires 13, 13 are supported close to the wall or other suitable support 6 they have a tendency in a wind storm to rub or chafe against the wall or other suitable support, which injures the insulation.

In both forms of my invention the bridle ring is attached to a conduit or cable clamp without loosening the securing screw 5.

Having thus described this invention in connection with illustrative embodiments thereof, to the details of which I do not desire to be limited, what is claimed as new and what is desired to secure by Letters Patent is set forth in the appended claims.

What I claim is:—

1. A conduit or cable clamp formed of a single thickness of material and bent to form a hook portion to support a cable and a base portion to lie flat against a wall or other suitable support, the base being provided with a slotted flange, a portion of the slotted flange being bent back on the upper surface of the base to form a finger or lug adapted to be bent over a portion of a bridle ring to secure the bridle ring on the exposed surface of the base.

2. A conduit or cable clamp having a hook portion to hold a conduit or cable and a base to lie against a wall or other suitable support, the base being provided with a flange having two slits or kerfs between its ends to form a finger or lug adapted to be bent over a portion of a bridle ring to secure the same to a conduit or cable clamp, a portion of the bridle ring adapted to rest upon the slitted flange to throw the bridle ring away from the wall or other suitable support.

3. The combination of a conduit or cable clamp having a hook portion to hold a conduit or cable and a base to lie against a wall or other suitable support, the base being provided with a flange having two slits or kerfs between its ends to form a finger or lug adapted to be bent over a portion of a bridle ring to secure the same to a conduit or cable clamp, a portion of the bridle ring adapted to rest upon the slitted flange to throw the bridle ring away from the wall or other suitable support and a bridle ring having two arms each of which is adapted to rest upon the slotted flange.

JOHN KARITZKY.

Witnesses:
F. W. KARITZKY,
BERNARD C. KRANZ.